United States Patent [19]

Khimèche et al.

[11] Patent Number: 4,493,076
[45] Date of Patent: Jan. 8, 1985

[54] SECURITY SYSTEM FOR A DISTRIBUTED CONTROL EXCHANGE

[75] Inventors: Abdel-Cader Khimèche, Chatenay Malabry; Marc Kemler, Velizy-Villacoublay, both of France

[73] Assignee: Compagnie Industrielle des Telecommunications Cit-Alcatel, Paris, France

[21] Appl. No.: 420,212

[22] Filed: Sep. 20, 1982

[30] Foreign Application Priority Data

Sep. 18, 1981 [FR] France ............................ 81 17644

[51] Int. Cl.$^3$ ............................................. G06F 11/20
[52] U.S. Cl. ................................. 371/11; 179/18 ES; 179/18 EE
[58] Field of Search ................. 371/9, 11; 179/18 EE, 179/18 ES

[56] References Cited

U.S. PATENT DOCUMENTS

| | | | |
|---|---|---|---|
| 3,974,343 | 8/1976 | Cheney et al. | 179/18 ES |
| 4,256,926 | 3/1981 | Pitroda et al. | 179/18 EE |
| 4,276,451 | 6/1981 | Beebe et al. | 179/18 ES |
| 4,292,465 | 9/1981 | Wilson et al. | 179/18 ES |

OTHER PUBLICATIONS

Hamer-Hodges et al., System 250-A Fault Tolerant Modular Processing System for Control Applications, Systems Technology, Nov. 1977, No. 27, (G.B.), pp. 26-34.
Bourne et al., The DMS-100 Distributed Control System-Fault Tolerance, Digital-Style, Telesis 1980 Four, (Bell-Northern Research, Canada), vol. 7, pp. 6-12.
International Conference on Communications, vol. 3 Jun. 8-12, 1980, W. Guilarte et al., Maintenance Advantages for a Distributed System, pp. 46.5.1 to 46.5.7.
Telcom Report (Siemens Revue) 1981, pp. 12-17, "EWSD Digital Switching System" H. Eberding—Software in the EWSD System.
International Switching Symposium, Oct. 25-29, 1976, pp. 423.3.1 to 423.3.8, Wurhmann, Corrective Maintenance in the Integrated PCM, Telecm. System.
International Switching Symposium, May 11, 1979, Paris France pp. 970-977, Brakel et al., Structural Aspects of TCP 36 Multiprocessor Control etc.
GEC Journal of Science and Technology, vol. 45, No. 3, Coventry (GB) pp. 116-122, Nissen et al., A Fault-Tolerant Multimicroprocessor for Telecommunications and General Applications.

Primary Examiner—Charles E. Atkinson
Attorney, Agent, or Firm—Sughrue, Mion, Zinn, Macpeak, and Seas

[57] ABSTRACT

A security system for an exchange having distributed control. Exchange control is distributed among a plurality of microprocessors and in microprocessor terminal units connected to a time-division switching network. The security system is organized on three levels: (I) a first level comprising security means in each microprocessor for detecting faults and for taking decisions concerning current processing; (II) a second level comprising means for managing said security blocks and for switching over from one block to another and re-configuring the links affected by the switchover; and (III) a third level comprising means for managing the microprocessors of the exchange control means and the two point-to-point links, said third level means comprising two identical peripheral control units controlling respective mass memories each containing a copy of the software needed to run the exchange.

8 Claims, 9 Drawing Figures

SECURITY SYSTEM FOR A DISTRIBUTED CONTROL EXCHANGE

FIELD OF THE INVENTION

The invention relates to a security system for a distributed control exchange. It is applicable in particular to the telecommunications and telematics industries.

BACKGROUND OF THE INVENTION

Technological developments in the telecommunications industry, linked with developments in integrated electronics and in computing, have led to very rapid development of services to users and to the facilities available to personnel running exchanges. Increased component reliability and developing test means have led people to seek for security systems capable of increasing the quality of service and of reducing the number of urgent interventions required and also the frequency of normal maintenance interventions.

An effective security system requires rapid-acting detection means for detecting faults and responding thereto, for example by switching over to a spare member. The system also requires means for accurately localising the members affected by the fault and means for enabling maintenance personnel to act efficiently. These include display interfaces and means for assisting repair.

In exchanges controlled by a central processor, a technique which was developed during the 70's, system security is likewise centralised: the processor is duplicated, auxiliary members and members of the switching network are duplicated, and specific means are provided for testing the telephone equipment under processor control and for indicating the results.

Nowadays it is is possible to benefit from the advantages of distributed control, this is most particularly due to the development of microprocessors and their software.

Unfortunately, the advantages and flexibility in use and the modularity of a distributed control system tend to be in conflict with requirements for a reliable security system.

Thus, in a distributed control exchange having several thousands of lines, it is necessary to have two levels of microprocessor control: the first level in which the processor supervises a plurality (up to a few tens) of terminals and a second level concerning hundreds or thousands of terminals, e.g. for controlling switching, charging or maintenance. Now a modular exchange necessarily comprises some number of blocks or groups of equipments, and the second level of control may either be integrated with these groups or else it may be outside them, in which case a second level processor is not necessarily rigidly associated with any particular group.

When the second level is integrated with these groups, a security system can readily be organised on a local level. A system of this type is described, for example, in published French patent application No. 2 420 260 entitled "Distributed control digital switching system" in the name of International Standard Electric Corporation. A drawback with this solution comes from the fact that the second level processors need to be duplicated.

A two-level system of control in which the second level is not integrated with the modules is described in an article by Shimasaki entitled "A versatile digital switching system for central office NEAX 61" (proceedings of the ISS Paris colloquium 79-7 on the May 11, 1979) volume 2 pages 688 to 695. This system provides distributed security in association with centralised maintenance. However, such a system still has drawbacks in that system security requires specific links between the two levels and also in that the second level processors are not interchangeable which means that they must be duplicated.

Another two-level system in which the second level comprises groups of interchangeable processors which are connected to one another and to the processors on the first level by semaphore channel data links is described in the Applicants' French patent application No. 81 068 07 entitled "A distributed control time division exchange".

Preferred embodiments of the present invention provide a security system for application to an exchange of the last mentioned type in which the security system does not detract from the modularity and flexiblity of the exchange.

SUMMARY OF THE INVENTION

The present invention provides a security system for distributed control exchange having a time-division switching network, the exchange comprising:

switches;

markers for controlling the switching network;

groups of terminal units in which each terminal unit comprises a plurality of terminals controlled by a microprocessor and is connected to the switching network via multiplex links;

peripherals including disks, dialog terminals, magnetic tape transports, and data links via modems; and exchange control means comprising a plurality of interchangeable control units and a plurality of peripheral control units for controlling the peripherals;

the interchangeable and the peripheral control units being connected to one another by two point-to-point links and being connected to the switching network by multiplex links, and each control unit and each peripheral control unit including a controlling microprocessor;

wherein each peripheral control unit, each interchangeable control unit, each point-to-point link, each switch, each multiplex link, each terminal unit, each terminal, and each peripheral constitutes a security block capable of being independently isolated from the rest of the exchange, and wherein the security system is organised on three levels:

(I) a first level comprising security means in each microprocessor for detecting faults and for taking decisions concerning current processing;

(II) a second level comprising means for managing said security blocks and for switching over from one block to another and re-configuring the links affected by the switchover; and (III) a third level comprising means for managing the microprocessors of the exchange control means and the two point-to-point links, said third level means comprising two identical peripheral control units controlling respective mass memories each containing a copy of the software needed to run the exchange.

Preferably the software is organised as reconfigurable logical machine means managed by said third level means with fault signalling functions being centralised to a maintenance logical machine which receives messages from second level means and sends display messages to the display means.

BRIEF DESCRIPTION OF THE DRAWINGS

A preferred embodiment of the invention is described by way of example, the architecture described concerns an exchange for switching telematics and/or telephone conversations. In the drawings.

DETAILED DESCRIPTION OF THE PREFERRED EMBODIMENTS

Figure 1:
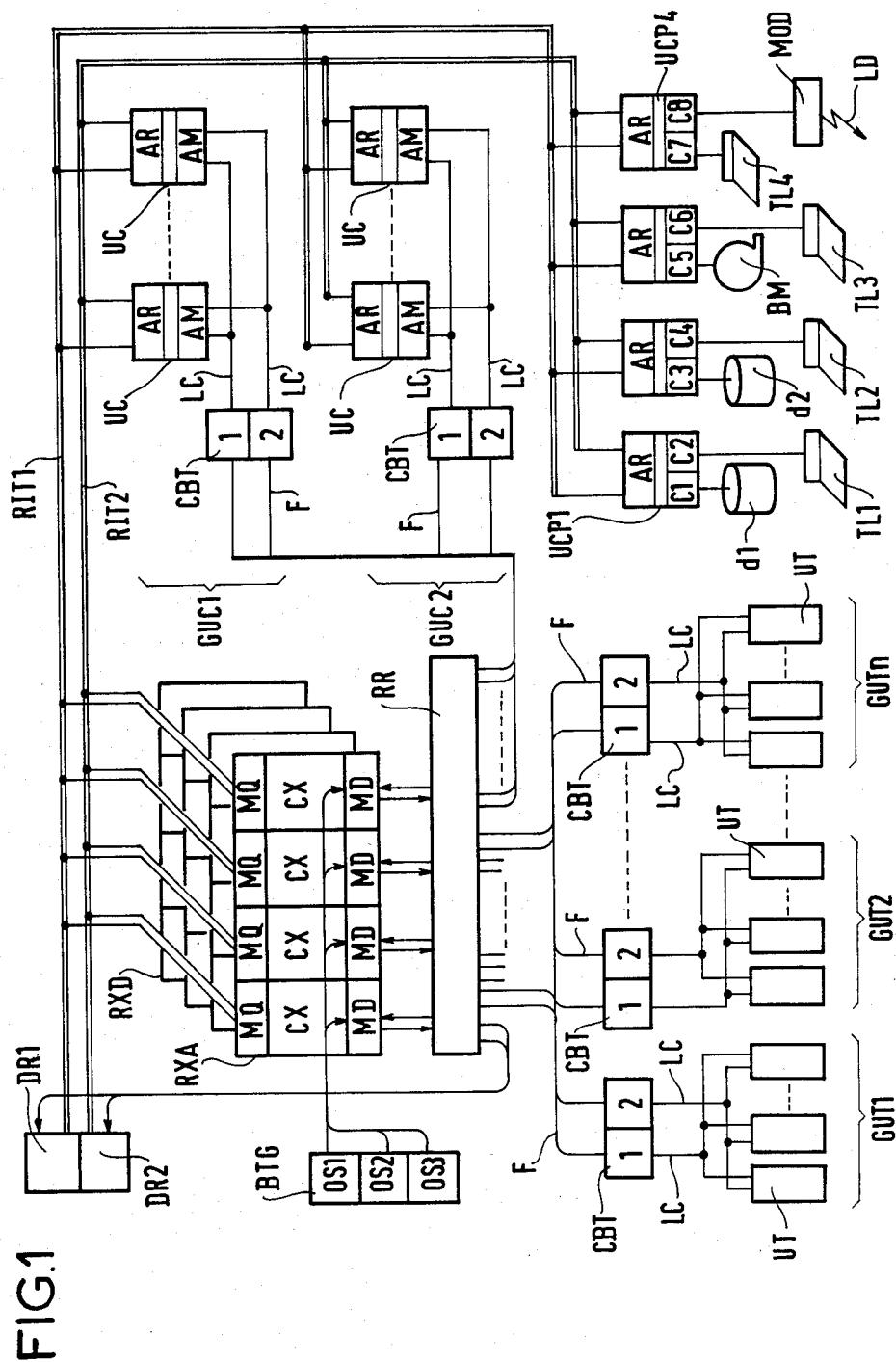
FIG. 1 is an overall diagram of an exchange with distributed control and in accordance with the invention.

The time-division exchange shown in simplified manner in FIG. 1 comprises the following members:

(1) Groups of terminals units GUT1 to GUTn comprising subscriber terminal units UT, analog and digital circuits UT, and auxiliary terminals for signalling, for applying tones and recorded announcements to subscriber lines, for testing subscriber lines and circuits, for conference circuits, etc.

(2) A central switching network having a single stage of switching. The network is organised in independent planes, e.g. four planes RXA to RXD. The figures given in this description are merely by way of example and to simplify the drawings.

(3) Exchange control means of distributed architecture constituted by groups GUC1 and GUC2 of identical control units UC each comprising a microprocessor. The control units are interchangeable. The control means also includes one or more peripheral control units UCP1 to UCP4. These control units may be identical to the preceding control units, but they cannot be totally interchangeable on account of their couplers C1 to C8 providing physical connections with the peripherals (disks d1 and d2; dialog terminals or computer-type consoles TL1 to TL4; magnetic tape transports BM; and data links LD using modems MOD).

The above three portions of the exchange are interconnected as follows:

(1) The terminal units UT are connected to each of the planes RXA to RXD of the switching network via multiplex links, e.g. multiplex links each comprising 32 time slots which are 8 bits wide. There are thus four multiplex links, and the terminal units of each group are connected in parallel to the four multiplex links.

(2) The control units UC are likewise connected to the switching network via multiplex links, with one multiplex link per group GUC to each plane of the network. Messages interchange between control units UC and terminal units UT are transmitted via time slots in the multiplex links which are connected by the switching network in a semipermanent and reconfigurable manner. Data transmission channels are thus provided having a data rate of 64 Kbits/sec. which are used according to the so-called HDLC procedure defined in the CCITT's standard 150.

(3) The control units UC and the peripheral control units UCP are interconnected by point-to-point links RIT1 and RIT2 which are doubled up for safety reasons. They are serial links which likewise use an HDLC procedure. Access to these links is managed by a duplicated controller DR1, DR2 which authorises transmission thereover and which supervises the durations of such transmissions.

Each link RIT1 and RIT2 comprises five pairs of wires going to each station connected thereto, for the purposes of calling, authorisation, clock transmission, signal transmission, and signal reception.

Each plane RXA to RXD of the central switching network comprises four time switches CX for example, each of which is associated with a marker MQ and with a signal distribution module MD. Each marker MQ comprises a microprocessor. The markers are controlled by the control units UC via the point-to-point links RIT1 and RIT2.

All the above mentioned units: UT, UC, UCP and MQ are provided with respective send/receive circuits for interchanging HDLC type messages, e.g. an MC 6854 type circuit manufactured by MOTOROLA or an 8273 circuit manufactured by INTEL.

The control units UC and the peripheral control units UCP have access to the links RIT1 and RIT2 via couplers AR, and the control units UC have access to the PCM channels via couplers AM. The couplers AR and AM provide semaphore mode access, and they may, for example, be of the type described in the Applicants' above mentioned French patent.

A switching stage must also be provided in each terminal unit UT to enable any particular terminal to be connected to a time slot in any of the multiplex links serving the terminal unit in question.

Figure 2:
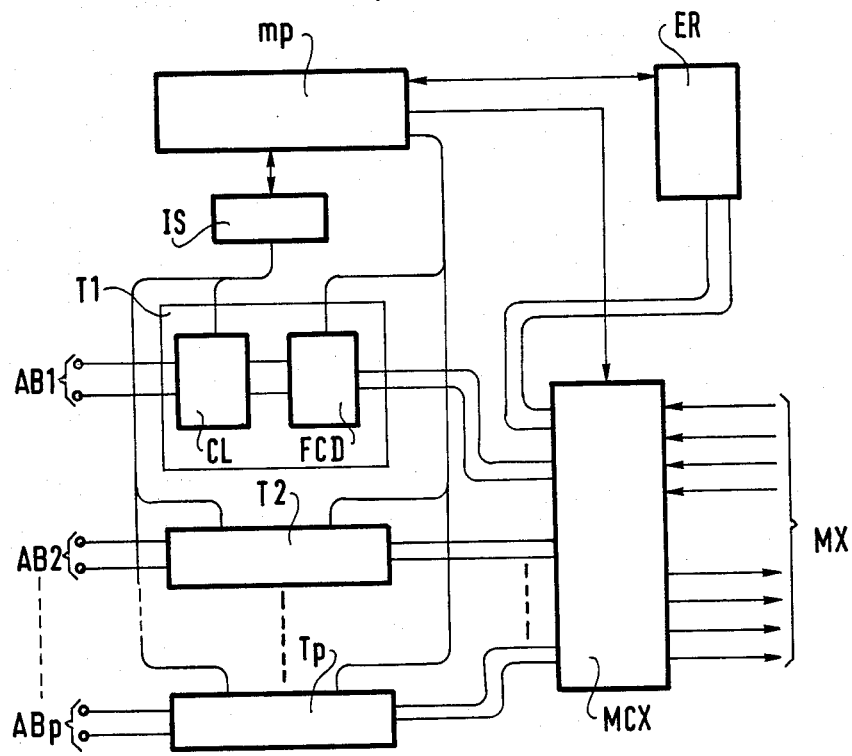
FIG. 2 shows a subscriber terminal unit.

An example in the form of a subscriber terminal unit is shown in FIG. 2. Each terminal T1 to Tp is constituted by a line circuit CL which comprises power supply means, protection means, loop supervisory means and ringing current injection means, and by an analog/-digital transcoding and filtering circuit or codec FCD. Each terminal is connected to a corresponding subscriber AB1 to ABp.

The terminal unit is controlled by a microprocessor mp connected before multiplex links MX via a send-/receive circuit ER. The switching stage in this example is a space division switching matrix MCX which is connected via the multiplex links MX to the planes RXA to RXB of the switching network.

Time switching is provided by the codecs by synchronisation on to the chosen time slot under the control of the microprocessor. The microprocessor also controls the line circuits via a supervisory and control interface IS.

For security reasons and for modularity, the links between the central switching network and the groups of terminal units GUT and the groups of control units GUC are organised in the form of parallel connections F (FIG. 1) each of which comprises two multiplex links, one clock distribution link and one synchronisation link.

The parallel connections F are connected to the switching network distribution frame RR (FIG. 1) and, in each group of terminal units and in each group of control units to a duplicated clock and synchronisation circuit CBT.

Each group of units is connected by two parallel connections F which serve to convey the four multiplex links providing access to the four planes of the switching network.

Each synchronisation and clock circuit CBT provides a set of time signals to the units of a group, via a common duplicated link LC which comprises two multiplex links.

A master time base BTG comprises three oscillators OS1, OS2 and OS3. It may, for example, be of the type described in the Applicants' published French patent specification No. 2 390 856.

Each oscillator delivers a clock signal H1, H2 or H3 together with a frame synchronising signals SY1, SY2 or SY3 at the frame frequency of the multiplex links.

Synchronous distribution of the clock signals and the synchronising signals to all the exchange equipment is provided by signal distribution modules MD (FIG. 1) which perform majority choices on pairs of the clock signals and synchronising signals as received from the three oscillators, check for errors and then distribute the signals to r destinations via r links D1 to Dr per module.

Figure 3:
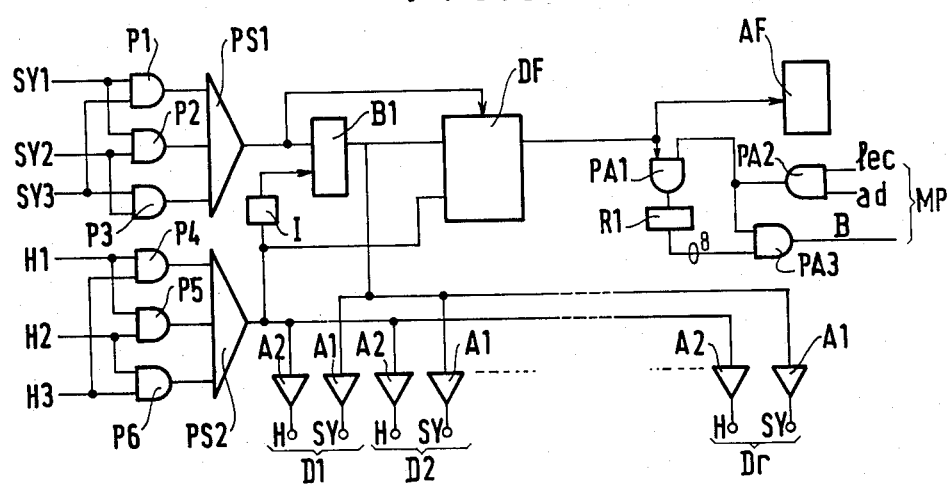
FIG. 3 is a circuit diagram for a time base distribution module.

FIG. 3 shows an example of a signal distribution module MD. The synchronisation signals and the clock signals from the three oscillators are respectively received by two majority choice circuits, each of which comprises three AND gates P1, P2, P3 or P4, P5, P6 as the case might be connected to respective inputs of an OR gate PS1 or the synchronisation signals and an OR gate PS2 for the clock signals.

Figure 4:
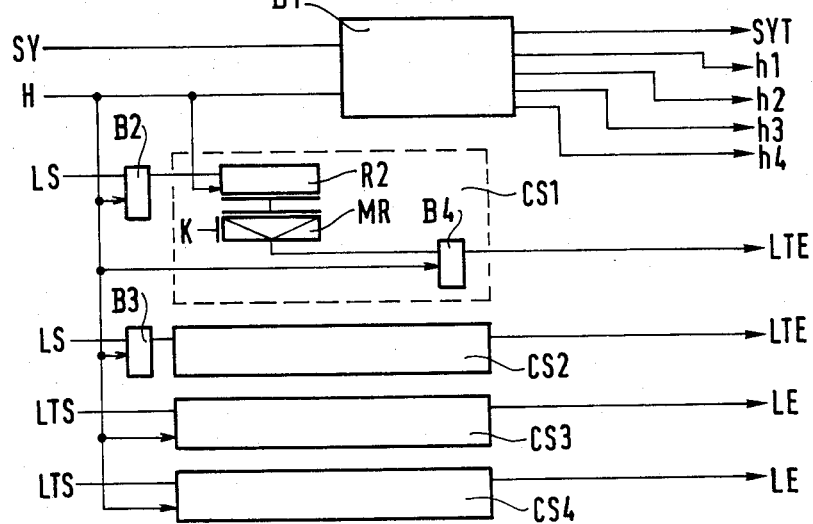
FIG. 4 is a block diagram of a time base circuit for a group of terminal units.

The OR gate PS1 is connected to amplifiers A1 via a bistable B1 which is clocked by the falling edge of the majority signal from the gate PS1 via an inverter I1. A fault detector DF is connected to the output from the gates PS1 and PS2, to the output from the bistable B1 and to the input to a display AF for providing a warning of distribution faults. Naturally the oscillators have their own fault detection means. An interchange register R1 and access providing AND gates PA1 to PA3 serve to supervise the distribution module MD from an associated microprocessor MP. In a preferred embodiment, the modules MD are situated in slots in the switching network, and they are supervised by the microprocessors in the markers. At the groups of terminal units GUT, each clock circuit and time synchronising circuit CBT is connected to a distribution module MD and to two multiplex links MX, in other words to two outlet links LS and to two inlet links LE. The two circuits CBT of each group are connected to different planes in the switching networks and to independent modules MD. The circuits CBT include an internal time base circuit BT which generates synchronising signals SYT and clock signals h1 to h4 as required by the terminal units UT, and also by the synchronising circuits CS1 to CS4 of the multiplex links (FIG. 4).

The synchronising circuits CS1 to CS2 are inserted between the two outlet multiplex links LS and the two inlet multiplex links to the terminals LTE. The synchronising circuits CS3 and CS4 are inserted in between the two outlet multiplex links from the terminals LTS and the two inlet links LE.

Further, the outlet links LS are sampled by bistables B2 and B3 driven by the clock signals H.

The synchronising circuits CS are in the form of a buffer register R2, a multiplexer MR whose address K is hard wired in such a manner as to insert a constant phase shift that depends on the type of terminal units in the group concerned, and an outlet bistable B4.

Two additional parallel connections F provide the clock signals H and the synchronisations SY from the distribution frame RR to the controllers DR1 and DR2 to enable them to generate the clock signals for the point-to-point links RIT1 and RIT2.

The two parallel links F connected to a single member are completely independent since their connections come from different planes. Further, the corresponding modules are served by separate power supplies.

The choice of active parallel connection may be made independently by the microprocessor at each terminal unit. In fact, it possesses its own local oscillator.

For example, suppose that a group of terminal units GUT is supervised by a control unit UC which cyclicly polls all the terminal units UT which it supervises. A fault on the parallel connection in use will be detected by the terminal units UT since they no longer receive the polling signals and they will therefore change over to the other other parallel connection to provide another channel for communication with the control unit UC. The control unit UC will be made aware of the change over by identifying the channel on which it receives acknowledgement to its polling.

These principles are applied to all types of terminal units, subscriber units, line units, signalling units, tone generator and recorded announcement units, and units for testing lines and junctors.

Figure 5:
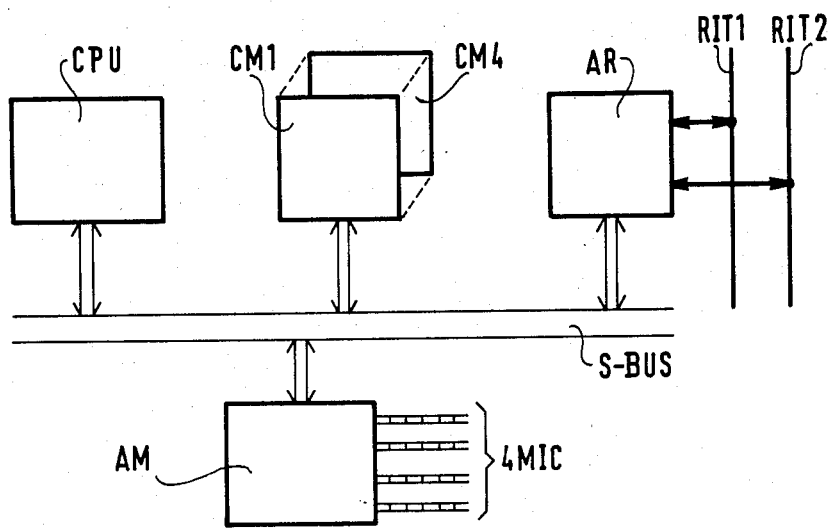
FIG. 5 is a block diagram of an interchangeable control unit.

A control unit UC is shown diagrammatically in FIG. 5.

A control unit UC comprises the following members connected to a system bus S-BUS.
(a) a processor card CPU;
(b) memory cards such as CM1 to CM4;
(c) an interface card AR connected to the links RIT1 and RIT2; and
(d) an interface card AM having four multiplex links which serve a group of control units GUC.

The cards CPU, AR, AM and the S-BUS are described in the above mentioned patent application.

Figure 6:
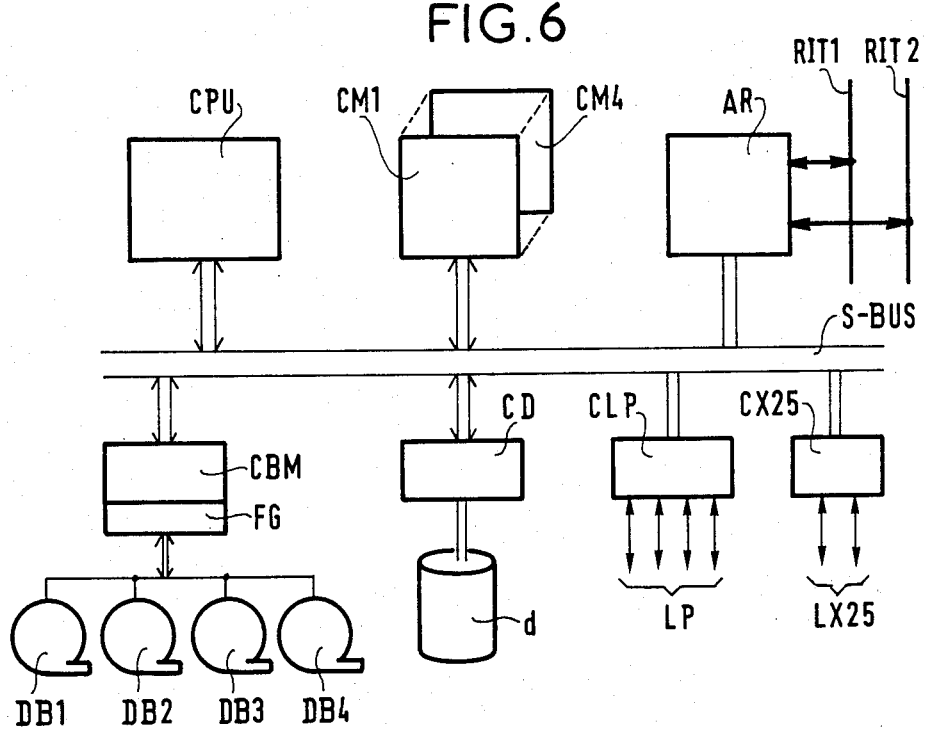
FIG. 6 is a block diagram of a peripheral control unit.

A peripheral control unit UCP is shown diagrammatically in FIG. 6 and is of similar architecture to the control unit UC, and it comprises a plurality of peripheral interfaces such as:
(a) a magnetic tape interface CBM associated with formatting logic FG driving four tape transports DB1 to DB4;
(b) an interface CD to a disk drive d;
(c) a programmable interface for data links CLP which may manage up to four two-way links LP that are separately exploitable in synchronous or asynchronous mode, for example; and
(d) an interface CX25 for links LX25 using the procedure X25 as defined by the CCITT.

In this application the peripheral control units UCP are not connected to the switching network (no interfaces AM).

The microprocessor is given access to the bus system S-BUS and to an internal bus for managing the resources available on the card CPU, namely read only memory containing initialisation programs, read/write memory, registers, and timing means. The microprocessor may, for example, be an INTEL type 8086 circuit.

The programs are distributed by the nature of the system. It is organised as logical machines, which are sub-assemblies of the program as a whole, and which are viewed as being independent control units that communicate with their environment only by exchanging messages. The logical machines correspond to logically independent functions: processing telephone calls, managing files, interpreting operator commands, timekeeping, ...

Thus, from the user point of view the control means is replaced by a network of logical machines. This generalisation of the equipment architecture is due to two considerations:

(1) The control units have to communicate by messages since they do not share any memory in common; and (2) A distinction is drawn between a logical machine and a physical machine since, for reasons of cost, several independent functions may be grouped on a single control unit in order to maximise use of its memory and its computing power. The functions are grouped together when the system is generated.

Some logical machines may be repeated in several microprocessors. For example there may be 1 to 32 logical machines for processing telephone calls, with each of them dealing with some number of subscribers and circuits to other exchanges. The capacity of the exchange can thus be increased by adding extra control units.

The logical machines are addressed by name rather than by a physical address. A message is sent to a logical machine in the same manner regardless of whether the destination logical machine is in the same control unit or in another. Thus, reconfigurations are transparent to most programs.

The logical machines have the following characteristics:

(1) There are units for setting up links and for loading;

(2) There is a set of tasks (asynchronous processes);

(3) Messages are addressed to tasks in the logical machines;

(4) Each task has two message queues associated therewith: one request queue and one queue of replies to requests; and (5) The tasks within a single logical machine may likewise communicate with each other by exchanging messages.

The operating system is constituted by a resident kernel which is repeated in each control unit. It includes:

(1) An initialisation sequence in read only memory capable of loading the rest of the resident kernel on initialisation; and (2) A system SGTE for managing tasks and interchanges which constitute the heart of the operating system. This system is itself constituted by two subassemblies;

(2.1) A set of services that serve to manage interchanges, the memory, and the tasks. This set of services comprises primitives that are called by the logical machines:

(a) message sending;

(b) waiting for requests and replies;

(c) connection to an interrupt procedure (such a procedure communicates by means of messages with the other tasks of the logic machine to which it belongs; and (d) reading various data: time, number of the current task, (2.2) A supervisor logic machine which is always included in each microprocessor on starting up. The supervisor logic machine provides services connected with managing the microprocessor, and in particular:

(a) loading a logical machine in a control unit and activating it;

(b) indicating where to find the logical machines placed in other microprocessors;

(c) removing a logical machine;

(d) restarting a control unit; and (e) updating its clock.

Further, the supervisor logic machine provides test and security functions for the control unit and for managing the data, and also includes debugging functions.

By distributing the program in the form of logical machines and tasks that communicate with each other via messages with the destination being recognised by an identity code (logical machine number, task number) which is independent of the physical location thereof, it is possible to configure the system in one configuration initially and then to reconfigure it after a modification or a breakdown in the control unit.

To do this, the location of logical machines is controlled by a logical machine for managing the control network MLR, i.e. the exchange control means, the point to point links RIT1 and RIT2 and the link controllers DR1 and DR2. To discover the state of a system and to control its reconfiguration, the management logical machine MLR periodically interrogates all the miroprocessors. A maintenance task is located in each miroprocessor and it performs internal tests to indicate the state of the processor to the management logical machine MLR.

The software program is stored on duplicated disks for security reasons. The disks are controlled by different microprocessors. On initialisation, the two microprocessors controlling the disks have an initialisation sequence which decides by times interchange of messages which of them is to start first and become the master microprocessor. The initialisation sequence of the master is loaded as follows:

(1) The system SGT for managing tasks and interchanges;

(2) A logical machine for file handling; and (3) The logical machine for managing the control network.

The switching network management logical machine polls the initialising sequences of the other microprocessors to determine which ones are present, and then establishes a map of the network and allocates logical machines to the microprocessors.

Figure 7:
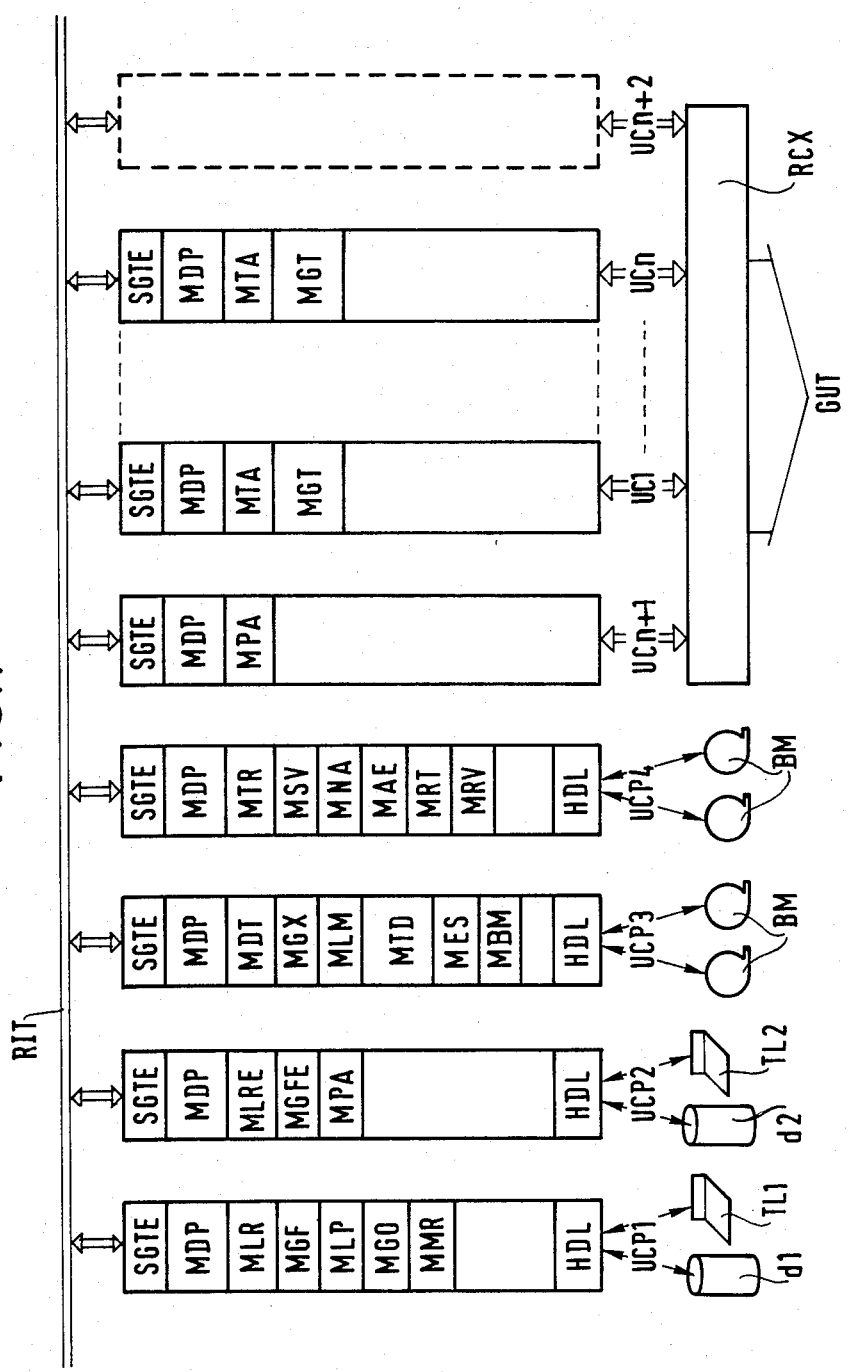
FIG. 7 is a diagram showing software distribution.

FIG. 7 shows how the logical machines are arranged in an average sized telephone exchange for normal operation. In the figure there are four peripheral control units UCP1 to UCP4, two of them having disks d1 and d2 and a dialog terminal TL1 and TL2, and the other two having tape transports BM. There are n control units UC for processing calls, and at least one spare control unit UC n+1, if the exchange is large enough to warrent it, there is a second spare control unit UC n+2. The configuration shown includes the system for managing tasks and interchanges as already mentioned under the reference SGTE together with the following logical machines:

MDP: a logical machine for manipulating physical data, controlling access to internal microprocessor tables by the other logical machines on the same microprocessor.

MLP: a logical/physical conversion machine located in the master peripheral control unit and serving to convert logical data on the disks into data used by the programs, for example the operating programs.

MLR: a logical machine for controlling the control network. This machine is located in the master peripheral control unit UCP1.

MLRE: a logical machine for controlling the control network and of the same type as the preceding logical machine, but located in the slave peripheral control unit UCP2 and serving to supervise the master peripheral control unit.

MGF and MGFE: master and slave logical machines respectively for managing files on disk.

MPA: a logical machine for loading relocatable programs. These programs concern operator instructions and are stored on disk and may be loaded into any of the microprocessors, for example in the spare control unit UC n+1 so long as it is not being used for processing calls.

MMR: monitor logical machine which manages the sequencing of operating programs.

MGO: a logical machine for controlling operator terminals.

MGT: a logical machine for controlling terminals T located in a control unit UC and managing a plurality of groups of terminal units thereby a constituting a super group of terminal units.

MTA: a call processing logical machine which further includes interface tasks in particular for communication with logical machines MTR, MSV, MOT and MLM.

MTR: a centralised translation logical machine having tables that are too large to be located in all of the machines MTA.

MSV: a backup storage logical machine for ensuring that calls in progress are not lost in the event of a failure in a control unit UC with consequent switchover to the spare control unit.

MNA, MAE, MRT and MRV: logical machines for service processing (short-code dialling, call storage, temporary redirection, morning alarm calls . . . ).

MGX: a logical machine for controlling the switching network, multiplex links and the time bases.

MOT: a logical machine for observing traffic.

MLM: a logical machine for maintenance, which centralises fault messages and controls alarms.

MES: a logical machine for running tests (regular and on request).

MBM: a logical machine for controlling the magnetic tapes.

HDL: logical machines for controlling access to the peripherals (handlers).

MTD: a logical machine for controlling data transmission lines.

Figure 8:
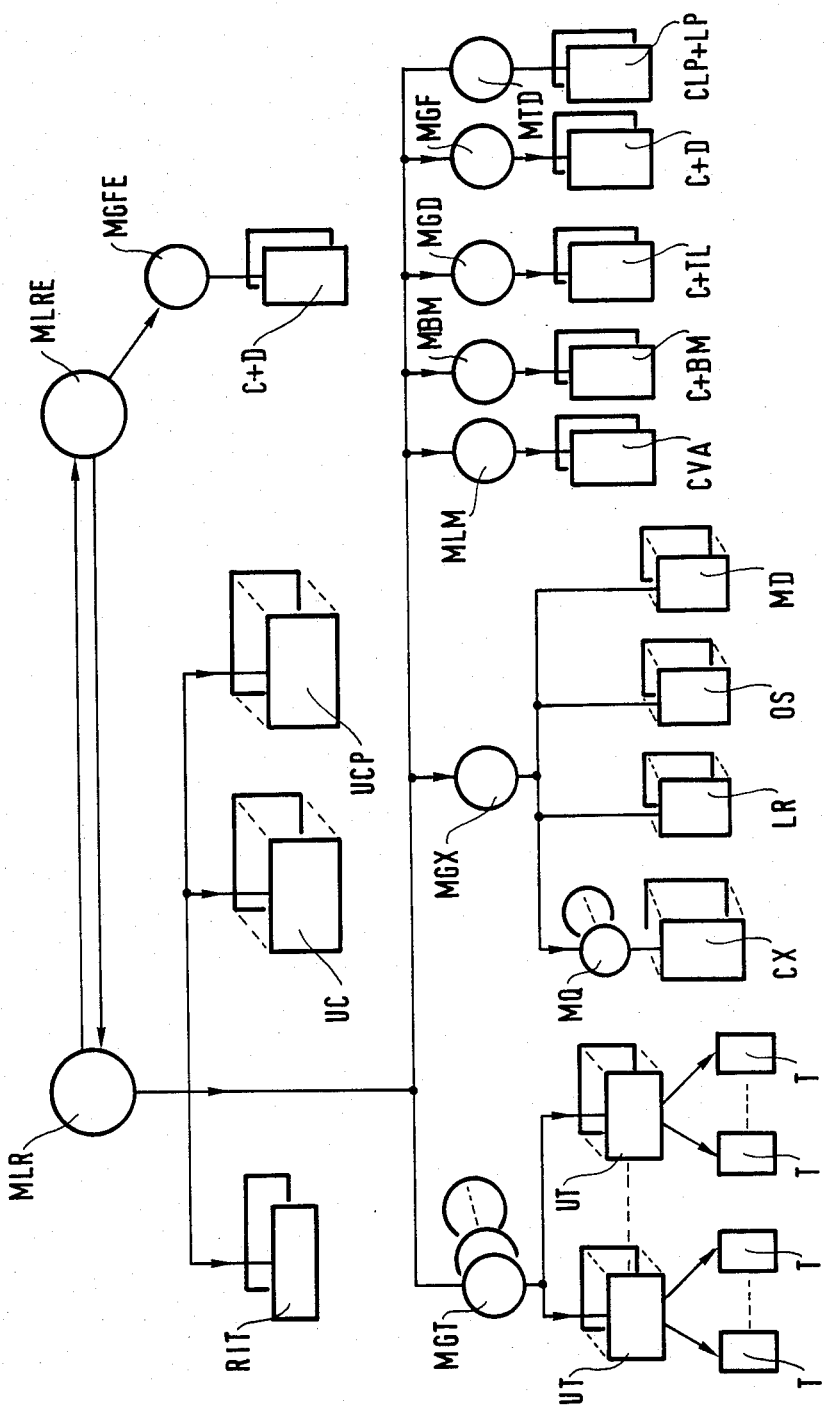
FIG. 8 is an overall diagram of the security system organisation.

The security system shown in FIG. 8 is organised in three levels:

(1) Control network security, provided at the level of the microprocessors which are equipped with disks (UCP1 and UCP2) by the logical machines MLR and MLRE.

(2) Speech network security, provided at the level of the control unit UC or the peripheral control unit UCP in which a logical machine MGX is located, and at the level of control units including other machines for managing the terminal units and peripheral interfaces (MGT, MBM, MGO, MGF, MLM and MTD).

(3) Terminal unit UT security and security for the peripheral control unit interfaces, provided by the microprocessors in these units.

This architecture is shown in FIG. 8 which shows redundant members making reconfiguration possible and the logical machines concerned with management functions.

In the system in accordance with the invention, the equipment is divided into two sets:

(1) A set of functional blocks capable of being isolated (security blocks) each of the functional blocks that follows constitute a security block: peripheral control unit UCP; control unit UC; each of the links RIT; each switch CX; each multiplex link; each terminal unit UT; each terminal P; and each peripheral BM, d, TL and the data link LD.

(2) Functional assemblies that are not capable of being isolated and used redundantly: the oscillators OS1 to OS3; the signal distribution modules MD; and power supply converters CVA in the event that these are not duplicated.

Figure 9:
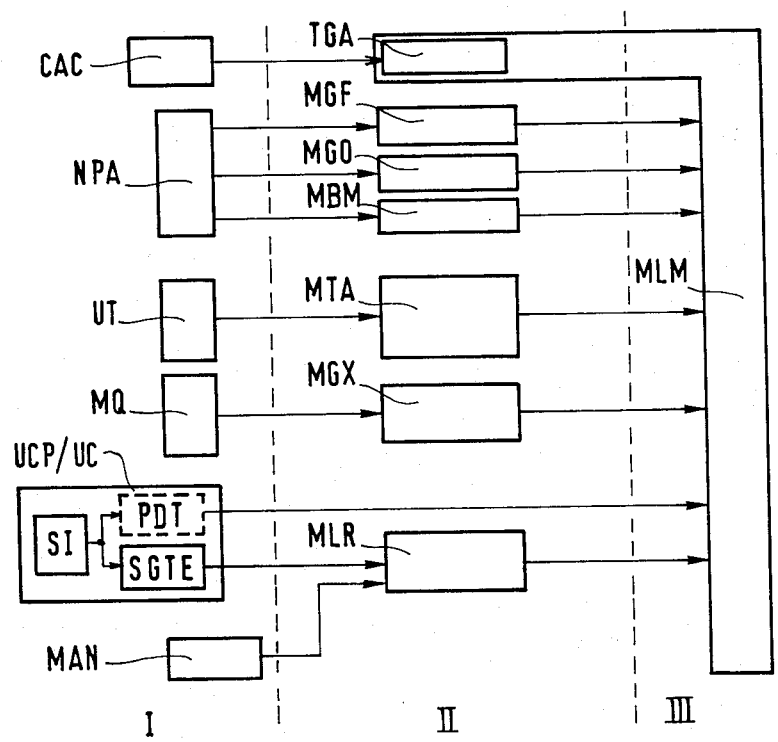
FIG. 9 is a block diagram showing how security tasks are distributed.

The above description of the general outline of a security system shows how the above mentioned functions of detecting faults, providing security against them, locating them, signalling their presence and providing assistance in repairing them, may all be provided. These functions again distributed in three levels: a local level I, a management level II, and a central level III as shown in FIG. 9.

(1) Fault detection tests are decentralised through all the microprocessors in the system and their peripheral interfaces, this is at local level.

(2) Security is provided at two levels:

(I) At the local level I, i.e. at the level of the microprocessor which detects the fault, action is taken to determine how the process which gave rise to the fault shall continue: restart, abandon, reinitialising the equipment, releasing the equipment. Two kinds of fault are distinguished to make this decision:

(Ia) faults which can be retrieved, i.e. faults for which the local security system attempts to reset or retry thus giving rise to faults that are recovered from in the event of success, or fatal faults in the event of the number of retries exceeding some threshold;

(Ib) faults which cannot be recovered from, for which the local security system releases the resources endangered by the fault; as in an active communication test or a a passive connection test.

(II) Management level II, copes with the system level of security: putting security blocks out of service and reconfiguring the system. The manager of the system is informed of the actions undertaken by the local security and thus of the type of fault encountered:

(IIa) by spontaneously generated event reports by computer peripherals and their interfaces;

(IIb) by responses or lack of response to polling messages from the local security system. This concerns control units which are capable of sending spontaneous fault reports, but which cannot be relied to do so in the event of their own breakdown. The managing system maintains state tables indicating the state of the equipment it is managing, and it counts the faults from which the equipment has recovered in order to be able to isolate the equipment in which the number of fault recoveries exceeds some threshold.

(IIc) localising the fault serves to identify the subassembly which is faulty. This sub-assembly is referred to as a repair block and is constituted by a small number of printed circuit cards, often just one printed circuit card. When a repair block coincides with a security block, all that needs doing is a translation from its functional address to its geographical address (row, rack, slot). Otherwise, the logical machine managing the security block concerned must use the results of the tests to localise the fault either by cross checking several kinds of tests or else by performing a sequence of extra tests.

monitor logical machine MLR, and also test programs PDT which are loaded into the memory of a destination microprocessor and activated by the control network management logical machine MLR.

TABLE 1

| | | | | |
|---|---|---|---|---|
| MGT | Distributor (convertors) alarms<br>UT or T fault | MAINTENANCE | Alarm positioning<br>Reset alarms to zero<br>SB fault, following an alarm | Display alarms<br>MGF<br>MLR<br>MGX<br>MGT |
| MLR<br>MGX<br>MGF<br>MBM<br>MGO | UC or RIT fault<br>Switch of LR fault<br>Disk fault<br>Tape transport fault<br>TTY console fault | LOGICAL | Print alarm messages<br>Print fault and anomaly messages<br>Access to the tables providing a topo<br>Logical description of the configuration<br>Print which SB or RB is faulty | MGO<br>MGO<br>MGO<br><br>MGO |
| MGX<br>MGO<br>MGO | Non detailed channel fault<br>Request to run a maintenance<br>PA or PDT<br>Inhibit or enable storage of fault reports to tape | MACHINE | Request PDT load and run in UC<br>Report on running PDT or PA<br>Store fault reports on tape | MLR<br>MGO<br>MBM |

(III) The central level III covers fault signalling and managing alarms:

(IIIa) fault signalling: the logical maintenance machine MLM is informed of the faults detected by the system management machines and of the security actions performed in response thereto, and it prints out fault messages on a teleprinter and also sends fault records to a magnetic tape.

To do this, the maintenance logical machine MLM uses a table that serves as a topological description of all the equipment in the exchange. Table 1 shows the main messages that the system management machines send to the maintenance logical machine MLM, and the main messages which the maintenance machine signals to staff concerning the security actions taken by the management logical machines.

(IIIb) a special task TGA for managing alarms and an alarm display panel. The alarm display panel includes warning lamps which indicate the degree of urgency of an alarm and identifies the faulty equipment.

When there is a fault in a security block, the task TGA makes use of the data supplied by the management system concerned. The warning lamps are turned off after tests have been performed to verify that repair has been successful.

For the signal distribution modules MD, changes of state are signalled to the task TGA by the switching network management logical machine MGX. Finally, for the power supply converters and the air-conditioning, signalling contacts are provided in these devices and they are polled cyclically by a special interface CAC which communicates with the tasks TGA.

Further, assistance in trouble-shooting requires both relocatable maintenance programs PA loaded into the logical machine for loading relocatable programs MPA at the request of an operator, and then activated by the In FIG. 9 the bottom block anomaly messages MAN stands for the detection and security actions associated with anomalies detected by user programs. Anomaly messages are transmitted to the controlling network management logical machine which filters them before displaying them.

When a program other than a maintenance program detects an anomaly, some form of corrective action defined by the program (retry, reset) is attempted. An anomaly message is then directed to the control network management logical machine MLR identifying the program which detected the anomaly and the context in which it occurred.

The principle means for detecting faults will now be described by way of example.

The monitoring devices in the equipment itself provides a first layer of surveillance: these include parity checks (in the read/write memories of the control unit UC) and cyclic redundancy checks (CRC) on the main data paths, i.e. the links RIT, the interfaces AM, the disk interfaces, . . . and serve to prevent faults from propagating through the system by virtue of their rapid response time (a few tens of microseconds).

Watchdogs monitor the time that the main data paths are engaged, and forcibly release them if they are held too long.

The tests performed by the software are located in the microprocessor memories, these include initialisation tests, which may be partially in PROM, periodical or regular tests in resident programs, tests performed at the request of the management logical machines or at the request of an operator, either by the resident programs or by programs loaded from the master disk.

Control network tests

Initialisation tests

The initialisation sequence SI of each microprocessor contains a simplified test for the entire microprocessor card CPU, its memory, and its interfaces AR looped on themselves, this test is organised to locate a faulty card.

The interface AM is tested by looping data over a period of time in each control channel.

The RIT links are tested by sending messages over one of them to all the active processors and then sending the messages over the other link.

Periodic tests polling: the microprocessors are periodically interrogated by the control network management logical machine MLR.

wakefulness test (parity tests on the programs in PROM): these tests are performed by the system for managing tasks and interchanges SGTE.

Tests on request

These tests are loaded from disk on the request of an operator and then transferred and run in the designated microprocessor, after prior manual blocking thereof.

The control network management logical machine MLR monitors the performance of the program by timing it.

Switching network tests

Initialisation tests

An initialisation test (in the PROM of each marker) verifies the microprocessor of the CPU card, its memory RAM, its interfaces AR looped on themselves, and serves to bootstrap the marker software.

Use tests

The call processing logical machines MTA perform an active verification of the conversation path including the switching network when a caller goes off hook.

Periodic tests

Integrated in the markers there is both a periodic test of marker wakefulness, and a passive test of connections established in one quarter of the switching network plane, these tests compare the inlet and the outlet of the switching network.

Integrated in the terminal management logical machines MGT there are both periodic polls of the terminal units UT via the switching network and a distribution of the different groups of terminal units GUT over the planes and the signal distribution links D1 to Dr.

Tests on request marker: test the RIT link and the interface AR looped on itself.

Test that the memory corresponds to the memory of a standard switch.

active tests through a particular path, obtained by setting up loops in any two terminal units UT for conversation time slots, or by internal loops in an interface AM at a terminal unit UT for control channel time slots.

Preventative maintenance of the paths controlled by the switching network management logical machine MGX call on the terminal management logical machines MGT for setting up the loops and the internal loops in the interfaces AM and the terminal units UT.

Location test

After a fault has been detected during preventative maintenance on a path which includes several security blocks, the switching network management logical machine MGX runs tests to remove doubt by performing active tests on portions of the faulty path (for the purpose of determining which security block should be taken out of service: CB or UT).

Switch testing

An operator can test a switch which has been taken out of service by performing tests on a microprocessor card, on the memories, and also by performing active tests on the buffer memories which it contains, these tests are resident in the marker PROM.

Terminal units UT

Initialisation tests

Integrated in the terminal unit UT:

parity tests on the contents of the functional PROM (programmable read only memory) and on the RAM (read/write memory) performed each time a terminal unit UT is started, thereby checking out the microprocessor;

orders sent by the logical machine for managing terminals MGT are checked for grammatical correctness by the terminal unit.

Integrated in the logical machine for managing the terminals MGT:

on initialisation of a terminal unit UT the logical machine MGT checks the capacity of the machine to dialogue on all four control channels (one on each of the multiplex links) by instructing switchovers between the various channels.

Use tests:

active communication checks are performed (with internal looping in the terminal units) when a called subscriber answers, to check proper operation of the data path (coder/decoder, amplifiers, . . . ). Periodic tests, in particular tests on the wakefulness of the PROM in the terminal units;

Tests on request of the logical test machine which runs tests on the terminals MES. These tests are performed by robots located in the particular terminal units.

Disk and interfaces (managed by the logical machine for managing disk files MGF)

Initialisation tests a movable program requested by the operator is on the (slave) disk brought back into service: this test verifies reading and writing using complementary patterns over the entire disk capacity, before proceeding with duplication from the master disk.

a state test for testing the states of the disk as available in the inface.

Tests on operator request: testing that the disks match.

Tape transport and interface (managed by the logical machine for managing magnetic tapes MBM)

Initialisation test

Tests the states of a tape transport as provided by the transport interface.

Tests at the request of an operator

A movable program for testing localisation.

Dialog terminal TL and interface (managed by the machine for managing operator terminals MGO)

Initialisation test

Tests the states of a dialog terminal TL as supplied by its interface.

Test at the request of an operator

A movable program for localisation testing.

Detecting software anomalies

By the operating programs:
The operating programs verify that various states and other data match, for example:
messages coming from equipment or an unknown logical machine in the system;
a non-confirmed state from equipment;
successful restarts;
By preventative maintenance testing on the software
These tests are applied to:
programs
data and files.
These tests are made by:
comparing tables and files with their images on disk, by comparing tables and files on the master disk with the equivalent tables and files on the slave disk, and by comparing tables with the equipment itself; overseeing the different states of the equipment.

An example is given below of action taken by the switching network management logical machine MGX in the event of fault detection:

The fault is signalled by a marker in response to acquisition polling for test results.

The fault concerns a loop test on an RIT link/AR interface: the logical machine for managing the switching network MGX warns the logical machine for managing the control network MLR.

Otherwise, the logical machine MGX performs tests for removing any doubt, isolates the security block in question, and then warns the logical machines for managing the terminals MGT whose control channel may be affected by the fault.

A fault is indicated by the logical machine for call processing MTA, or by the logical machine for managing the terminals MGC to the logical machine for managing the switching network MGX by means of messages relating to faults detected by the tests they have performed and indicating a network fault. The machine MGX then proceeds to determine which security block is concerned by cross checking multiple indices. This enables it to isolate a single multiplex link (no reply on a channel from one or more groups of terminal units GUT) or one quarter of a plane (faults indicated by active communication testing and by the tests integrated in the markers MQ).

The system described enables the best advantage to be drawn from a modular exchange with distributed control. Breakdowns and anomalies are detected as close as possible to their origin. Security operates at the local level and a higher level is called on to help only when the fault has an effect outside the fault unit.

The security system has the same functional organisation as the exchange system itself and uses the same links. The security system operates by reconfiguring functional sub-assemblies (security blocks).

We claim:

1. A security system for distributed control exchange having a time-division switching network, the exchange comprising:
a switching network, comprising switches and markers, said markers controlling the switching network;
groups of terminal units, each terminal unit comprising a plurality of terminals controlled by a microprocessor and being connected to the switching network via multiplex links;
peripherals including at least dialog terminals and data links via modems; and
exchange control means comprising a plurality of interchangeable control units and a plurality of peripheral control units for controlling the peripherals;
the interchangeable and the peripheral control units being connected to one another by two point-to-point links and being connected to the switching network by multiplex links, and each control unit and each peripheral control unit including a controlling microprocessor;
wherein each peripheral control unit, each interchangeable control unit, each point-to-point link, each switch, each multiplex link, each terminal unit, each terminal, and each peripheral constitutes a security block capable of being independently monitored for faults and wherein the security system is comprised of a multi-stage fault monitoring and fault reaction system, comprising;
a first level comprising security means in each microprocessor for detecting faults and for taking decisions concerning current processing;
a second level comprising means for managing said security blocks and for switching over from one block to another and for re-configuring the links affected by the switchover; and
a third level comprising means for managing the microprocessors of the exchange control means and the two point-to-point links, said third level means comprising a pair of mass memories each containing a copy of the software needed to run the exchange, and a pair of peripheral control units for respectively controlling said mass memories.

2. A security system according to claim 1, wherein the software is organised as reconfigurable logical machines managed by said third level means, fault signalling functions being centralised to a maintenance logical machine which receives messages from the second level means, and sends display messages to a display means.

3. A security system according to claim 2, wherein the first level includes:
means for effecting initialisation tests in read only memory for checking the microprocessor circuits, its memory, and its interface with the point-to-point links; and
means for effecting maintenance tasks including test software which is activated periodically by the microprocessor and at the request of the second level of the security system.

4. A security system according to claim 3, wherein the second level comprises logical machines using messages to dialog with the maintenance tasks in the microprocessors of the first level and also with the maintenance logical machine.

5. A security system according to claim 4, further comprising means allowing the three levels to dialog with one another and with the maintenance logical machine via the point-to-point links and via the multiplex links.

6. A security system according to claim 4, wherein the logical machine for managing security blocks comprises a single switch of the switching network and security blocks comprising a single multiplex link.

7. A security system according to claim 4, wherein each of the logical machines of the second level includes localisation tasks for localising fault-generating blocks in need of repair, said localisation tasks operating on three types of test results:
  fault detection tests;
  multiple tests enabling localisation by crosschecking: and
  additional tests activated by a second level logical machine for further defining localisation.

8. A security system according to claim 7, including an alarm display panel for displaying alarms from security block faults as managed by the logical machines of the second level or from power supply converter faults in the exchange power supply, the alarm display panel being managed by a display panel task in the maintenance logical machine which receives alarm information from the logical machines of the second level and from a coupler which observes signalling contacts included in the converters.

* * * * *